(12) United States Patent
Griffin et al.

(10) Patent No.: US 11,875,297 B2
(45) Date of Patent: Jan. 16, 2024

(54) GENERATION OF DASHBOARD TEMPLATES FOR OPERATIONS MANAGEMENT

(71) Applicant: International Business Machines Corporation, Armonk, NY (US)

(72) Inventors: David Jon Griffin, Reigate (GB); Matthew Richard James Thornhill, London (GB); Luke Taher, Heswall (GB); Keith Jeremy Posner, London (GB)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 17/131,906

(22) Filed: Dec. 23, 2020

(65) Prior Publication Data
US 2022/0198362 A1  Jun. 23, 2022

(51) Int. Cl.
*G06Q 10/0639* (2023.01)
*G06F 9/451* (2018.01)
(Continued)

(52) U.S. Cl.
CPC ....... *G06Q 10/06393* (2013.01); *G06F 9/451* (2018.02); *G06F 16/2465* (2019.01);
(Continued)

(58) Field of Classification Search
CPC .. G06F 16/245; G06F 16/248; G06F 9/44505; G06F 9/451; G06Q 10/063
See application file for complete search history.

(56) References Cited

U.S. PATENT DOCUMENTS

| 8,224,893 | B2 | 7/2012 | Newman |
| 8,276,115 | B2 | 9/2012 | Bates |
| (Continued) | | | |

FOREIGN PATENT DOCUMENTS

| CN | 110989891 A | * | 4/2020 | ........... G06F 3/0481 |
| JP | 2018081403 A | | 5/2018 | |

OTHER PUBLICATIONS

"QualDash: Adaptable Generation of Visualisation Dashboards for Healthcare Quality Improvement", by Elshehaly et al., University of Bradford and the Wolfson Center for Applied Health Research, UK. Sep. 2020. (Year: 2020).*

(Continued)

*Primary Examiner* — Pan G Choy
(74) *Attorney, Agent, or Firm* — Peter Suchecki

(57) ABSTRACT

A computer-implemented method for generation of dashboard templates for operations management is disclosed. The computer-implemented method includes monitoring a user interactions with an editable dashboard user interface when handling issue instances to gather chart selections, wherein a chart is a graphical visualization of one or more parameters of a data source. The computer-implemented method further includes identifying an issue type to chart pairs from the gathered chart selections and, for each pair, generalizing the one or more data source parameters. The computer-implemented method further includes identifying from the gathered chart selections common associations between the issue type and a chart visualization type. The computer-implemented method further includes storing dashboard information for an issue type including one or more likely chart visualization types for one or more generalized data source parameters, wherein the dashboard information is available to generate a dashboard template for a new issue instance of the issue type.

18 Claims, 9 Drawing Sheets

(51) Int. Cl.
    *G06Q 10/10*     (2023.01)
    *G06F 40/186*     (2020.01)
    *G06F 16/2458*     (2019.01)

(52) U.S. Cl.
    CPC ........... *G06F 40/186* (2020.01); *G06Q 10/10* (2013.01); *G06F 2216/03* (2013.01)

(56) References Cited

U.S. PATENT DOCUMENTS

| | | | |
|---|---|---|---|
| 8,510,737 | B2 | 8/2013 | Kunjithapatham |
| 10,305,758 | B1* | 5/2019 | Bhide ................. G06F 16/2477 |
| 10,311,440 | B2 | 6/2019 | Stewart |
| 10,362,135 | B2 | 7/2019 | McNeese |
| 10,528,021 | B2 | 1/2020 | Billi |
| 10,585,912 | B2 | 3/2020 | Barmentloo |
| 2012/0054334 | A1 | 3/2012 | Befort |
| 2014/0040257 | A1* | 2/2014 | Chandrasekaran ... G06F 16/972 707/736 |
| 2015/0212663 | A1* | 7/2015 | Papale ................. G06Q 10/063 715/762 |
| 2016/0275151 | A1 | 9/2016 | Lovati |
| 2017/0004638 | A1* | 1/2017 | Csenteri ................ G06F 3/0486 |
| 2017/0147681 | A1* | 5/2017 | Tankersley ............. G06Q 10/00 |
| 2018/0024901 | A1* | 1/2018 | Tankersley ....... G06Q 10/06393 707/694 |
| 2018/0054352 | A1 | 2/2018 | Chefalas |
| 2018/0063386 | A1* | 3/2018 | Sharma .................. H04N 23/60 |
| 2018/0234307 | A1* | 8/2018 | Choudhary ....... G06F 16/24565 |
| 2019/0129395 | A1 | 5/2019 | Niemiec |
| 2019/0137958 | A1 | 5/2019 | Ericsson |
| 2019/0303619 | A1* | 10/2019 | Gkoulalas-Divanis ...................... G06F 16/214 |
| 2020/0286270 | A1* | 9/2020 | Lymperopoulos ...... G06F 16/26 |

OTHER PUBLICATIONS

"Dashboard User Guide for Water Quality Surveillance and Response System", by EPA, United States Environmental Protection Agency, Nov. 2015. (Year: 2015).*

"Dashboard and stories User Guide", by IBM, IBM Cognos Analytics Version 11.00, 2018. (Year: 2018).*

Mell et al., "The NIST Definition of Cloud Computing", Recommendations of the National Institute of Standards and Technology, Special Publication 800-145, Sep. 2011, 7 pages.

* cited by examiner

GENERATION OF DASHBOARD TEMPLATES FOR OPERATIONS MANAGEMENT

BACKGROUND

The present invention relates to operations management, and more specifically, to generation of dashboard templates for operations management.

The monitoring and repair of information technology services in a client data center, cloud or hybrid environment can be difficult across various layers, such as code, data, runtime, middleware, operating system, virtualization, servers, storage, and networking. Across all of these layers, it is key that all required components are operating correctly and that no parts of the system have failed. When a failure does occur, the teams supporting the services need to know that an issue has occurred and need some way of finding out how to diagnose and fix the issue. Information Technology Service Management software provides a means for support teams to track and assign these issues to a member of a support team, known as an operator, who is then responsible for resolving the issue.

SUMMARY

According to one embodiment of the present invention a computer-implemented method for generation of dashboard templates for operations management is disclosed. The computer-implemented method includes monitoring user interactions with an editable dashboard user interface when handling issue instances to gather chart selections, wherein a chart is a graphical visualization of one or more parameters of a data source. The computer-implemented method further includes identifying an issue type to chart pairs from the gathered chart selections and, for each pair, generalizing the one or more data source parameters. The computer-implemented method further includes identifying from the gathered chart selections common associations between the issue type and a chart visualization type. The computer-implemented method further includes storing dashboard information for an issue type including one or more likely chart visualization types for one or more generalized data source parameters, wherein the dashboard information is available to generate a dashboard template for a new issue instance of the issue type.

According to another embodiment of the present invention, a computer system for generation of dashboard templates for operations management is disclosed. The computer system includes one or more computer processors, one or more computer readable storage media, and program instructions stored on the computer readable storage media for execution by at least one of the one or more computer processors. The program instructions include instructions to monitor user interactions with an editable dashboard user interface when handling issue instances to gather chart selections, wherein a chart is a graphical visualization of one or more parameters of a data source. The program instructions further include instructions to identify an issue type to chart pairs from the gathered chart selections and, for each pair, generalizing the one or more data source parameters. The program instructions further include instructions to identify from the gathered chart selections common associations between the issue type and a chart visualization type. The program instructions further include instructions to store dashboard information for the issue type including one or more likely chart visualization types for one or more generalized data source parameters, wherein the dashboard information is available to generate a dashboard template for a new issue instance of the issue type.

According to another embodiment of the present invention, a computer program product for generation of dashboard templates for operations management is disclosed. The computer program product includes one or more computer readable storage media and program instructions stored on the one or more computer readable storage media. The program instructions include instructions to monitor user interactions with an editable dashboard user interface when handling issue instances to gather chart selections, wherein a chart is a graphical visualization of one or more parameters of a data source. The program instructions further include instructions to identify an issue type to chart pairs from the gathered chart selections and, for each pair, generalizing the one or more data source parameters. The program instructions further include instructions to identify from the gathered chart selections common associations between the issue type and a chart visualization type. The program instructions further include instructions to store dashboard information for the issue type including one or more likely chart visualization types for one or more generalized data source parameters, wherein the dashboard information is available to generate a dashboard template for a new issue instance of the issue type.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1A:
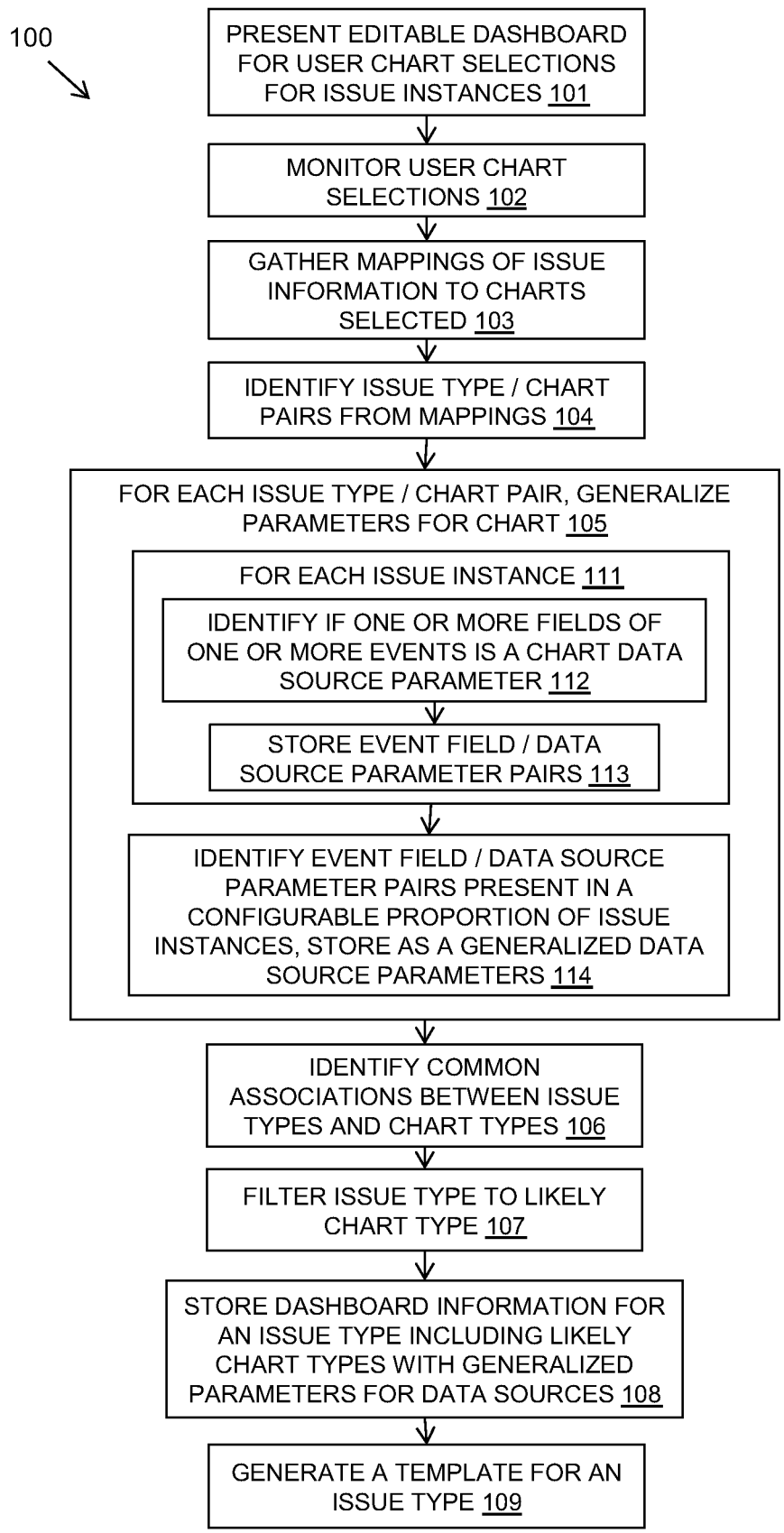
FIGS. 1A and 1B are flow diagrams of example embodiments of aspects of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates to operations management, and more specifically, to generation of dashboard templates for operations management.

Oftentimes, when a failure occurs in a client data center, cloud or hybrid environment, it is difficult for the support services to know that an issue has occurred and know how to diagnose and fix the issue. Embodiments of the present invention recognize there are many sources of data which can assist an operator to diagnose the cause of a given issue and come to a solution. Examples of useful data may include, but are not limited to: metrics, topology data (the relationships between resources in the system), related runbooks, knowledge base articles, and log data. Typically, during the investigation of an issue, an operator will log into multiple different systems in order to acquire various data and use it to further understand what has occurred. However, this data acquisition step can be time consuming, so it would be beneficial if there was a more automated way to find and aggregate data that is useful to a given issue.

In some organizations, a separate team may create predefined dashboards that aggregate useful datasets for the use in the resolution of issues. These dashboards can reduce the number of different systems the operator has to access in order to acquire the data and present the data in a way that is easy for the operator to use. However, this requires a lot of up front work to try and create these dashboards and it requires the team creating the dashboards to accurately predict what data will be required.

Embodiments of the present invention provide a means for support teams to track and assign issues. Embodiments of the present invention automatically generate dashboards which display data which is beneficial to the resolution of the specific issue. In an embodiment, the dashboard is generated dynamically based on the type of issue that has occurred and the datasets that previous operators have found useful for diagnosing and resolving the same or similar issues.

A method, computer program product, and system are described for automatically generating dashboards which display data that is beneficial to the resolution of a specific issue in information technology (IT) operations management. The dashboard is generated dynamically based on the type of issue that has occurred and the datasets that previous operators have found useful for diagnosing and resolving those types of issues in the past. The disclosed method is able to both derive the specific data sets of use for an issue as well as determine the most optimal way to present these data sets to the operator.

A dashboard is a graphical user interface that provides an information management tool for visually tracking, analyzing, and displaying data and metrics. In the case of an IT operations management dashboard, the dashboard provides visual illustration of collected datasets from multiple sources and analysis of that data by measurable parameters that set conditions for operation of the IT system. When an issue occurs in an IT system, the dashboard is used to aggregate useful datasets and provide visualization of parameters of the datasets to analyze and understand the issue. The visualization is used to provide insights to a user about a dataset, such as trends and outliers, and multiple visualizations of the same dataset may be provided.

A dashboard includes multiple charts in the form of user interface graphic elements which are defined as a combination of a data source, a visualization, and parameters required to retrieve data from the data source. For example, a chart may provide visualizations in the form of graphs, maps, etc. A chart may support comparisons between datasets, groupings of subsets of data, or other data manipulations. A chart may be static or interactive to explore the dataset further.

In an embodiment, a dashboard template is automatically generated for a type of issue based on historical dashboard graphics used by operators when handling issues of the same type. The automatic generation of a dashboard for an issue type may be considered as three level stages: operator action monitoring, training, and dynamic dashboard creation.

In the monitoring stage, when an operator is investigating an issue and the system has not been able to automatically derive a sufficient dashboard for the issue type, monitoring is carried out of operator actions of interactions with an editable dashboard. In this step, the operator will be able to choose from a pallet of datasets to add to their issue dashboard as well as be able to choose how to visualize them. The system may track these actions and store them alongside information about the issue that occurred. This gathers dashboard preferences for handling an issue type.

The training stage may be a continuous process which may use machine learning to create a mapping between types of issues and the typical charts of datasets with visualizations that operators choose to use. The parameters of the charts of the dashboard are generalized based on the properties associated with the issue. The output of this process is a model which encapsulates this generalized mapping.

The dashboard creation stage is carried out when an issue occurs of a type that has been captured in the model. The dynamic dashboard creation stage uses the mapping between issue type and optimal dashboard datasets and visualization to display a dashboard template to the user. For dashboard charts that were generalized, the relevant parameters are substituted from the properties of the current issue. If the operator requires information that is not displayed in the dashboard charts, they can add additional charts for data as carried out in the monitoring stage and the system may update the model accordingly.

Referring to FIG. 1A, a flow diagram 100 shows an example embodiment of an aspect of the described method of generating dashboard templates for issue types.

An editable dashboard graphical user interface tool may be presented 101 to users who are IT management operators where they can choose from a palette of charts for available data sources and visualizations when addressing issue instances. The available data sources and visualizations are provided by the system but may be expandable by an administrator to add additional data sources and visualizations.

The interaction with the editable dashboard tool may be monitored 102 for user chart selections by operators for instances of issues that are being diagnosed by the operators. The monitoring captures operator actions and selections for visualizations while the operator is diagnosing and resolving an issue. Monitoring may be performed for all issues that occur and acts to monitor the actions the operator takes in order to gather the data they require for resolution of an issue. Monitoring may include operator interactions with the editable dashboard tool including adding a chart, removing a chart, and configuring a chart data source.

As the operator adds charts to the dashboard for the combination of a data source, a visualization, and any parameters required to retrieve data from the source, the method tracks these choices and stores them. These choices are gathered 103 as mappings to the information of the issue itself, resulting in the storage of mappings between issue information and the chosen charts.

From the gathered mappings, issue type to chart pairs are identified 104. The issue information may be used to classify issues to an issue type. For example, this may take a set of event types of each event within the issue as the issue type.

Parameters of each chart are generalized 105 for the issue type. For each issue type to chart pair, the parameters may be generalized as follows.

For each issue instance 111 of an issue type to chart pair, the method may identify 112 if one or more fields of one or more events is a chart data source parameter and, if so, the event field to data source parameter pair is stored 113. For each issue type to chart pair, the method may then identify 114 one or more event field to data source parameter pairs that are present in a configurable proportion of issue occurrences. The event field to data source parameter pair is stored as a generalized data source parameter.

In this way, for each issue type to chart pair the method may identify, for all occurrences of the issue type, which field in the events of the issue have been used as a data source parameter for the chart using string matching. If it is possible to identify a common data source field across all occurrences of the issue, it is extracted as a generalized data source parameter.

This process identifies fields within an event set which hold the same value as the parameter entered for the chart. For example, for an event with type fan_failed, the server field may be set to 'server1.example.com'. If the user requested a dataset that represents the fan RPM for a server over time, with 'server1.example.com' as a query parameter, the system would look for and identify that 'server1.example.com' matches the 'server' field of the event with type 'fan_failed'.

In an embodiment, if it is consistently identified and/or identified a predetermined number of times that a data source parameter matches a field value of a given event, this is extracted as a generalized parameter. To take the above example, the server query parameter would have been identified as being sourced from the server field of the 'fan_failed' event.

In an embodiment, generalization of parameters are performed periodically once a satisfactory quantity of issue and chart data is collected. Generalizing the data source parameters of the chart enables the automatic selection of data source parameters for future issues of the given issue type. This enables a chart to be auto-populated with data for future occurrences of that issue type.

In an embodiment, association rule mining is performed on collected data between chart types and issue types to identify 106 common associations between chart types and issue types. This is used to identify preferred chart visualizations and layouts. Association rule mining is a rule-based machine learning method for discovering relations between variables.

An issue type to chart pair is read and association rule mining performed on baskets of pairs to produce association rules between common issue type to chart pairs. Following association rule mining, a series of association rules may be produced between individual chart types and issue types. These are associated with a support value of a minimum number of times a chart/issue type pair must be observed before an association rule is created and a confidence value which allow filtering 107 of the relationships with the highest likelihood to identify charts likely to be used by an operator for each issue type. Once filtering is completed, a collection of chart types is available for each issue type which are most likely to be used by an operator.

In an embodiment, the method stores 108 dashboard information for an issue type including likely chart types with generalized parameters for data sources. In an embodiment, the stored dashboard information is used to generate 109 a dashboard template for a new instance of an issue type.

Figure 1B:
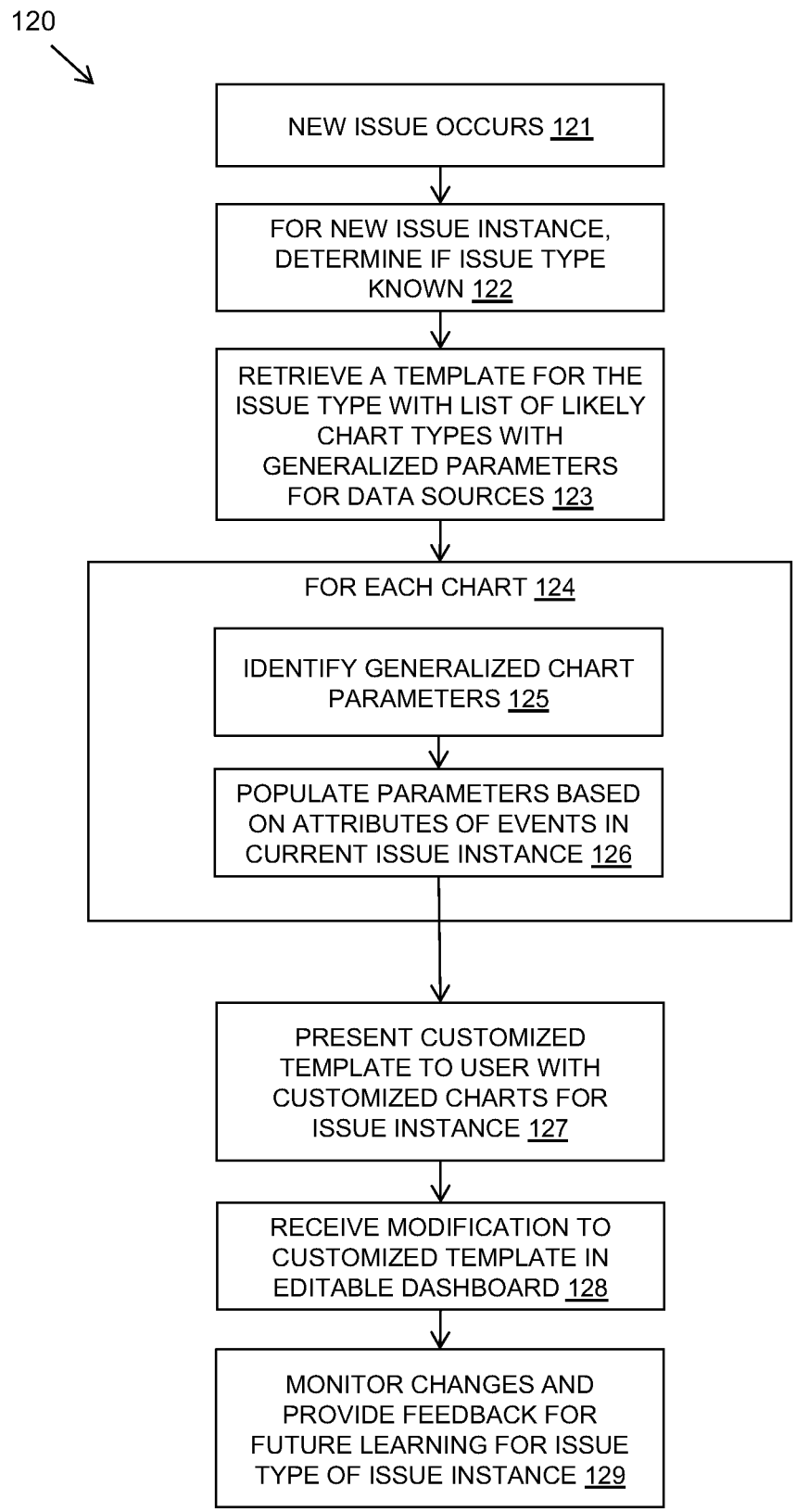

Referring to FIG. 1B, a flow diagram 120 shows an example embodiment of an aspect of the described method of generating a dynamic dashboard instance using a dashboard template when an operator handles a new issue instance.

When a new issue occurs 121, the method may determine 122 if any similar issues (i.e. issues of a same issue type) have occurred in the past. If issues of the same type have previously occurred, then the stored dashboard information in the form of a generated dashboard template for that issue type is retrieved 123.

In an embodiment, the template includes the chart visualization types with the highest likelihood of being chosen by the operator for the current issue, based on the association rule mining and filtering of steps 106 and 107 of FIG. 1A for generalized parameters of data sources. In this way, the template provides a list of parameterized charts for use in the dynamic dashboard instance. For example, the chart visualization types may represent a given visualization (for example, bar chart, line graph) as well as the set of generalized parameters (for example, 'Get fan RPM over time for server {{server field of fan_fail event}}').

For each chart 124, the method may identify 125 generalized chart parameters as generated for the template in step 105 of FIG. 1A. Each parameter may then be populated 126 by the method based on corresponding attributes of the events within the current issue. This provides a list of charts, with an associated data source, parameter set, and visualization.

In an embodiment, the method presents 127 the customized charts to the user in the customized template, allowing the user to use this information to further understand the issue. If the user wants to add more charts to the dashboard or to modify the existing ones, modifications may be received 128 to the customized template as provided by the editable dashboard as used in step 101 of FIG. 1A. The method may monitor 129 the changes (similar to with a new issue type) and use it as feedback for future learning to improve the model for the issue type.

Figure 2A:
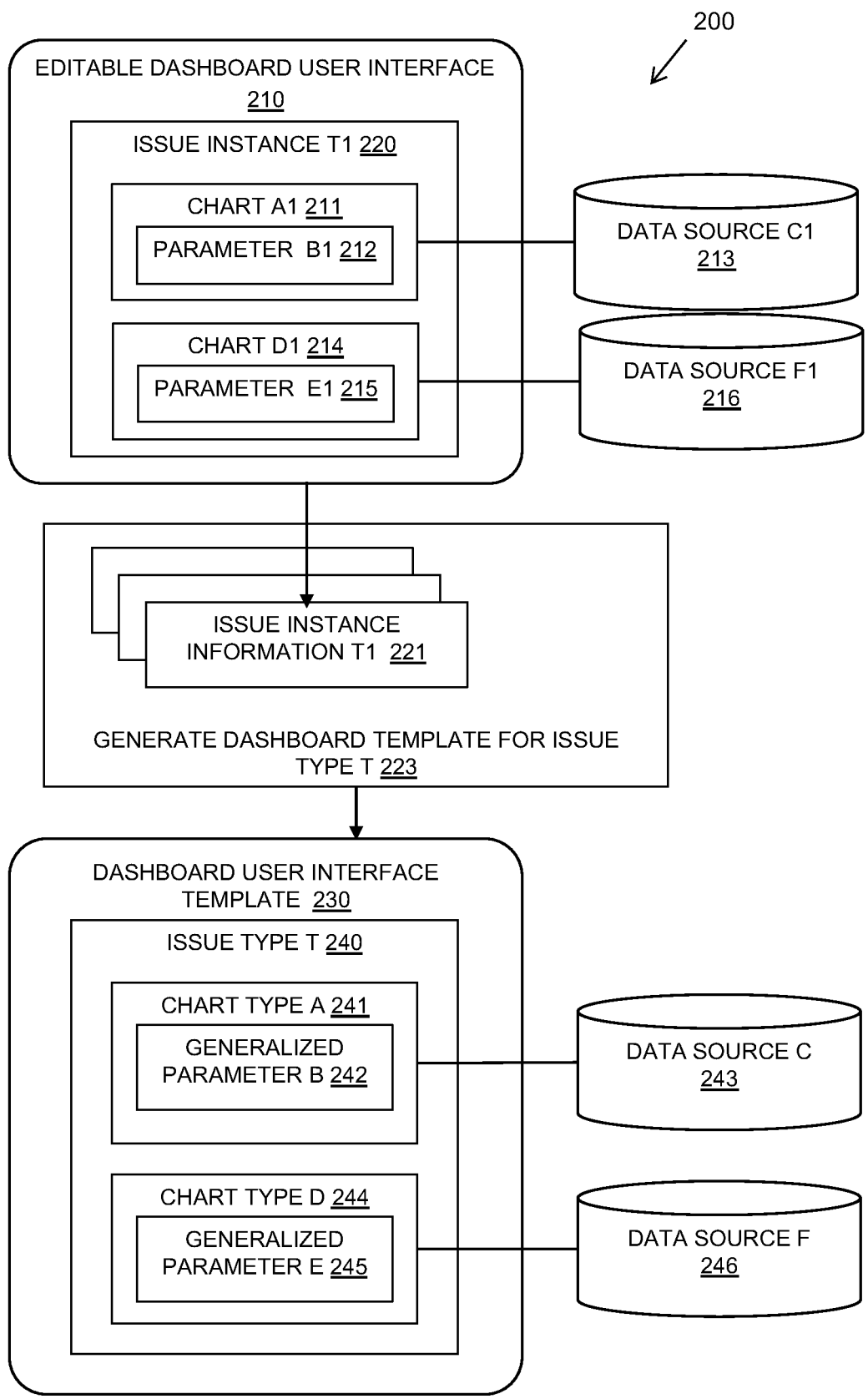
FIGS. 2A and 2B are schematic diagrams illustrating example embodiments of a dashboard template and dashboard instances in accordance with the present invention.
Figure 2B:
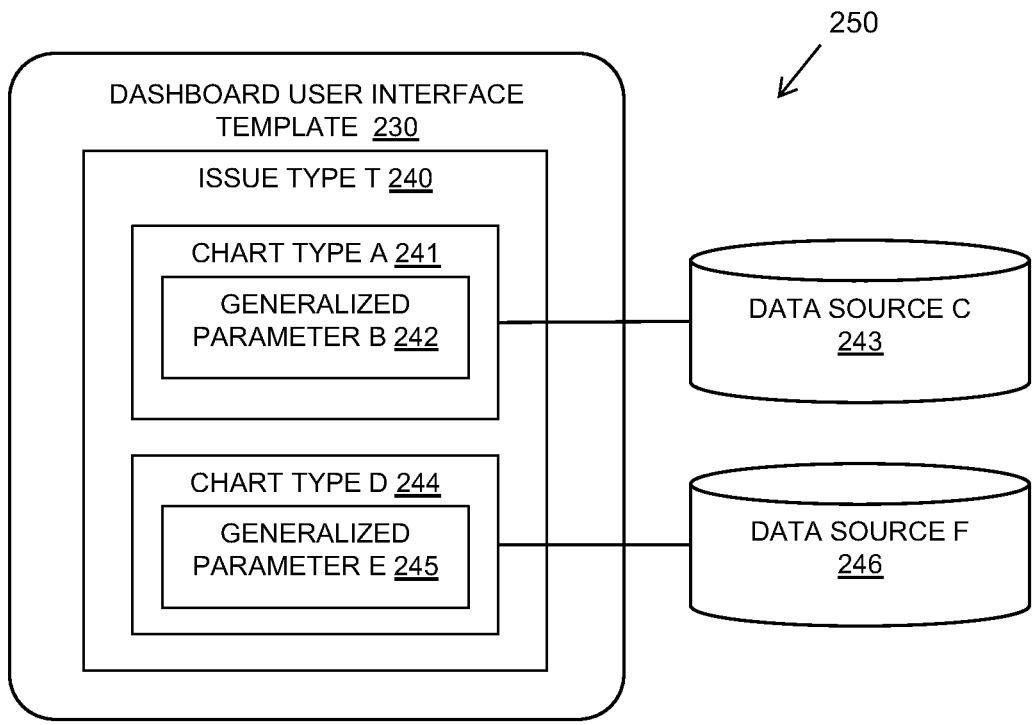
Figure 2B:
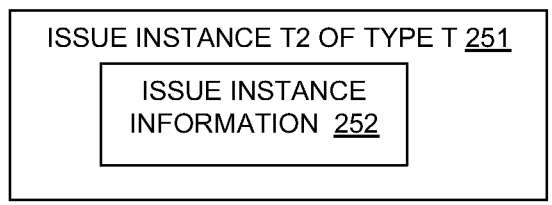
Figure 2B:
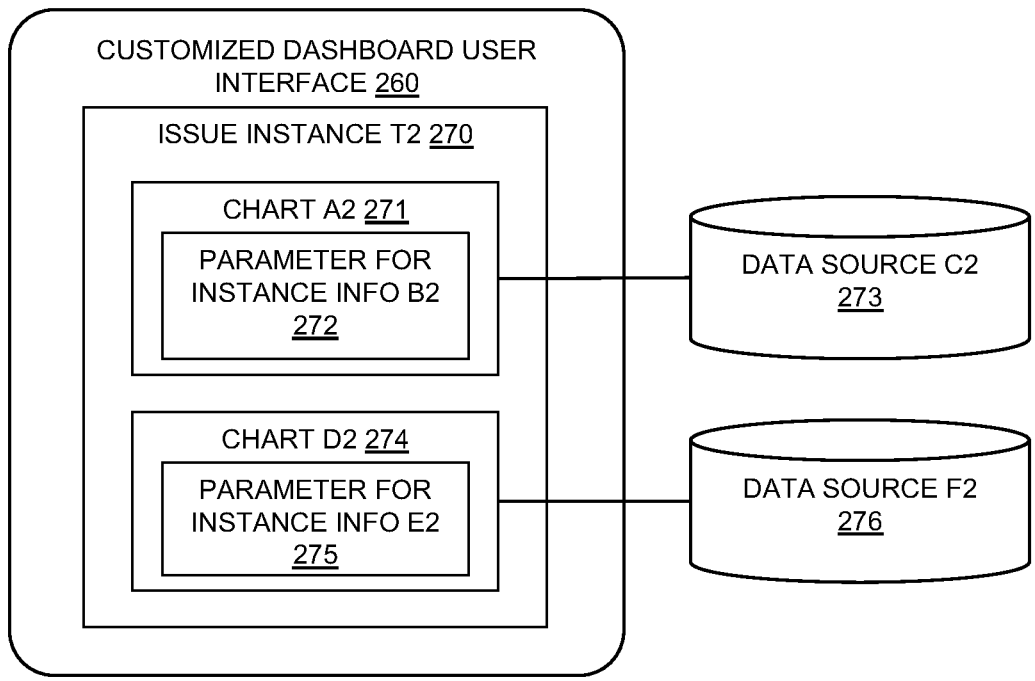

Referring to FIGS. 2A and 2B, schematic diagrams illustrate the described method of generating 200 a dashboard user interface template for an issue type as shown in FIG. 2A and the described method of using 250 a dashboard user interface template for an issue instance of the issue type as shown in FIG. 2B.

An editable dashboard user interface 210 is used for gathering chart information for issue instances 220. A single example issue instance T1 220 is shown with a first chart A1 211 for visualizing a parameter B1 212 of a data source C1 213 and a second chart D1 214 for visualizing a parameter E1 215 of a data source F1 216. The charts 211, 214 may be of selected chart types for visualization and layout as chosen by the user when resolving the issue instance 220. Two charts 211, 214 are illustrated; however, in practice there may be any number of charts that aid in the resolution.

FIG. 2A shows that a method 223 may generate a dashboard template for the issue type T of which issue instance T1 220 is an example. Issue instance information 221 may be gathered to classify the issue instance type for use in the method 223. The method 223 may be carried out once multiple issue instances of the issue type have been resolved and editable dashboard instances and information have been gathered.

In an embodiment, the method 223 generates a dashboard user interface template 230 for an issue type T 240 having a first chart type A 241 for visualizing a generalized parameter B 242 for data from a data source C 243 and a second chart type D 244 for visualizing a generalized parameter E 245 for data from a data source F 246.

FIG. 2B shows the dashboard user interface template 230 being used for a new issue instance T2 251 of type T having issue instance information 252. The dashboard user interface template 230 is customized to produce a customized dashboard user interface 260 for the issue instance T2 270. The customized dashboard user interface 260 includes a chart A2 271 of the type A 241 from the template with a specific parameter B2 272 based on the issue instance information 252 for visualizing data of the data source C2 273. Similarly, the customized dashboard user interface 260 includes a chart D2 274 of the type D 244 from the template with a specific parameter E2 275 based on the issue instance information 252 for visualizing data of the data source F2 276.

Figure 3:
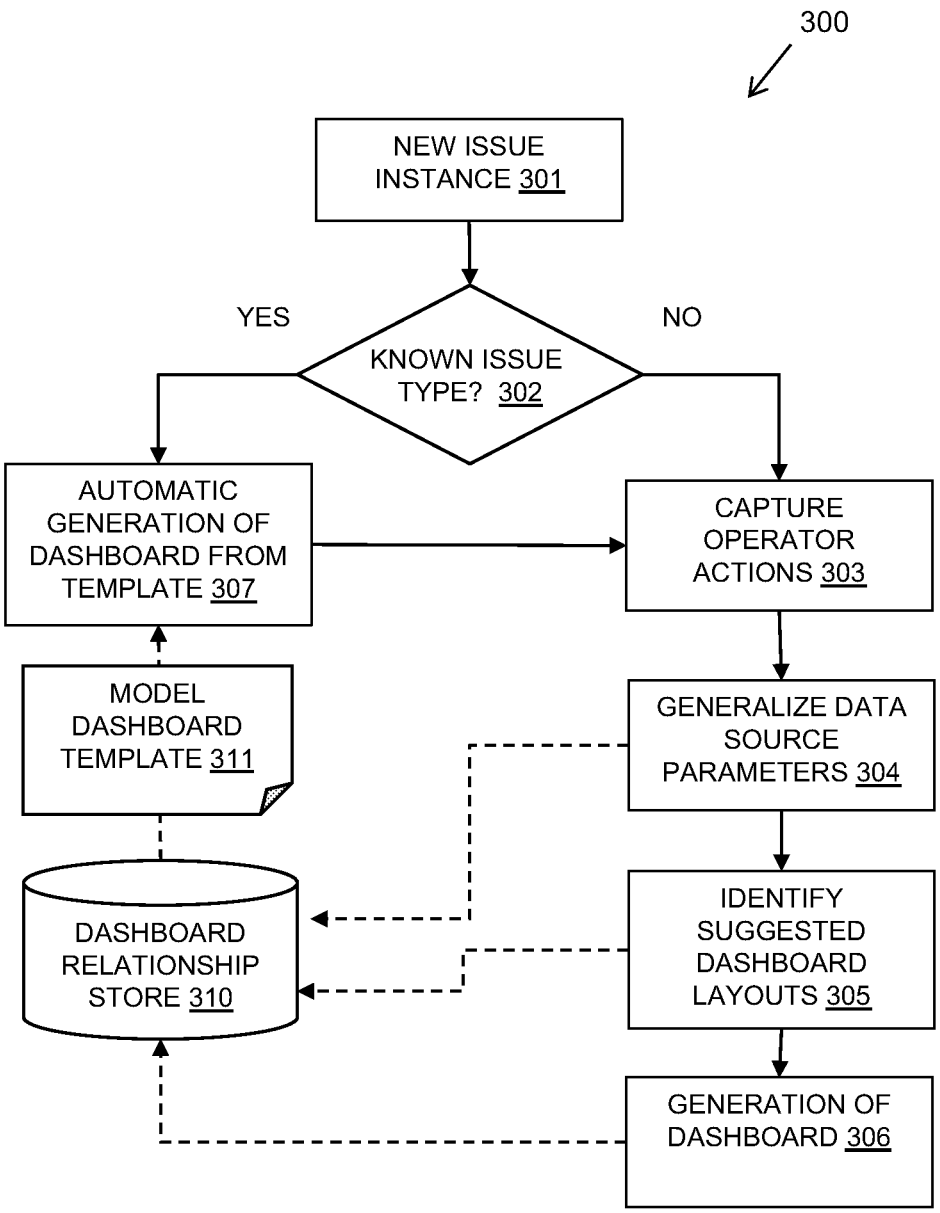
FIG. 3 is a flow diagram of another example embodiment of an aspect of the method in accordance with the present invention.

Referring to FIG. 3, a flow diagram 300 shows an example embodiment of a flow of the method shown in full lines and flow of the data in hashed lines. A new issue instance occurs 301 and it is determined 302 if it is a known issue type. If it is not a known issue type, the method may capture 303 operator actions, generalize 304 data source parameters, and identify 305 suggested dashboard layouts in order to generate 306 a dashboard for the issue instance.

The data of the generalized data source parameters 304, the suggested dashboard layouts (i.e. chart types) 305, and dashboard instance 306 are stored in a dashboard relationship store 310 and are used to model 311 a dashboard template for the issue type.

If it is determined 302 that the issue type is known, the method may automatically generate 307 a dashboard using the dashboard template 311 as a basis.

Figure 4:
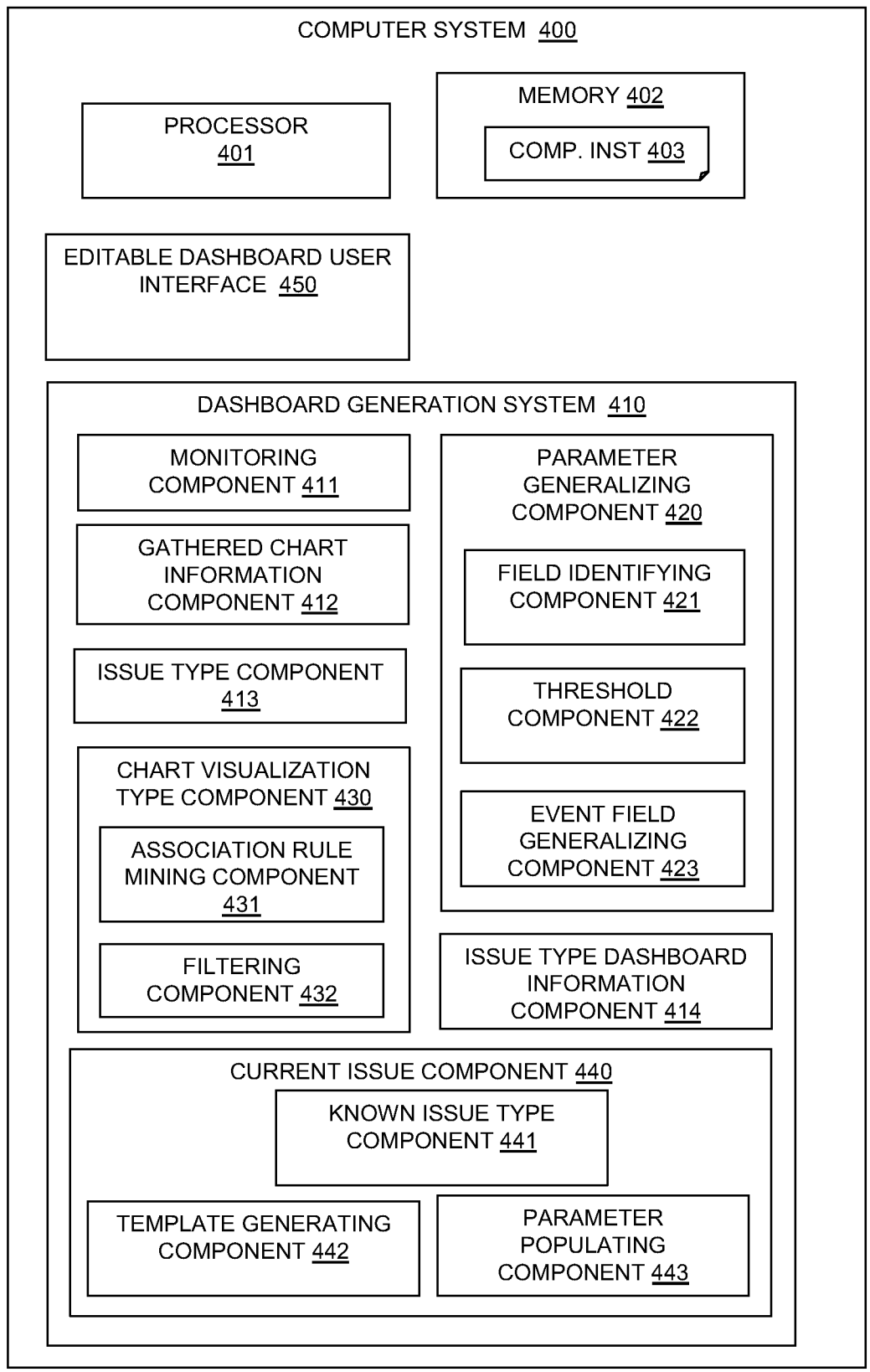
FIG. 4 is a block diagram of an example embodiment of a system in accordance with the present invention.

Referring to FIG. 4, a block diagram shows an example embodiment of a computer system 400 in which a dashboard generation system 410 is provided. The computer system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

In an embodiment, the dashboard generation system 410 includes a monitoring component 411 for monitoring user interactions with an editable dashboard user interface 450 when handling issue instances and a gathered chart information component 412 for storing gathered chart selection information. The dashboard generation system 410 may include an issue type component 413 for grouping user interactions for issue instances that relate to a same issue type based on the information of the issue instance.

In an embodiment, the dashboard generation system 410 includes a parameter generalizing component 420 for identifying from the gathered chart selections issue type to chart pairs and, for each pair, generalizing the one or more data source parameters.

The parameter generalizing component 420 may include: a field identifying component 421 for, for each issue instance, identify one or more fields of one or more events that is a chart data source parameter to store event field to data source parameter pairs; a threshold component 422 for identifying event field to data source parameter pairs present in a configurable proportion of issue instances; and an event field generalizing component 423 for generalizing the data source parameters of the identified event field to data source parameter pairs.

The dashboard generation system 410 may include a chart visualization type component 430 for identifying from the gathered chart selections common associations between issue type and chart visualization type. The chart visualization type component 430 may include an association rule mining component 431 for performing association rule mining on identified issue type to chart pairs to produce association rules between common issue type to chart pairs and a filtering component 432 for producing a series of association rules between issue types and chart visualization types with a support and confidence value to allow filtering to chart visualization types likely to be used by an operator for each issue type.

In an embodiment, the dashboard generation system 410 includes an issue type dashboard information component 414 for storing dashboard information for an issue type including one or more likely chart visualization types for one or more generalized data source parameters. The dashboard information is available to generate a dashboard template for a new issue instance of the issue type.

In an embodiment, the dashboard generation system 410 includes a current issue component 440 for receiving a current issue instance and a known issue type component 441 for determining if the issue instance is an issue type for which dashboard information is stored. The current issue component 440 may include a template generating component 442 for generating a dashboard template instance for a current issue instance of a known issue type with the dashboard template instance including options of one or more likely chart visualization types with one or more generalized data source parameters and a parameter populating component 443 for populating the generalized data source parameters with specific parameters for the current issue instance based on attributes of events in the current issue instance.

In an embodiment, the monitoring component 411 monitors user interactions with the editable dashboard user interface 450 when handling issue instances to gather chart selections includes monitoring selections and modifications to a generated dashboard template instance to provide feedback for dashboard information for an issue type.

In an embodiment, the monitoring component 411 also monitors user interactions with the editable dashboard user interface 450 when handling issue instances for an issue type gathers sufficient information for an issue type to store dashboard information for a new issue type.

Figure 5:
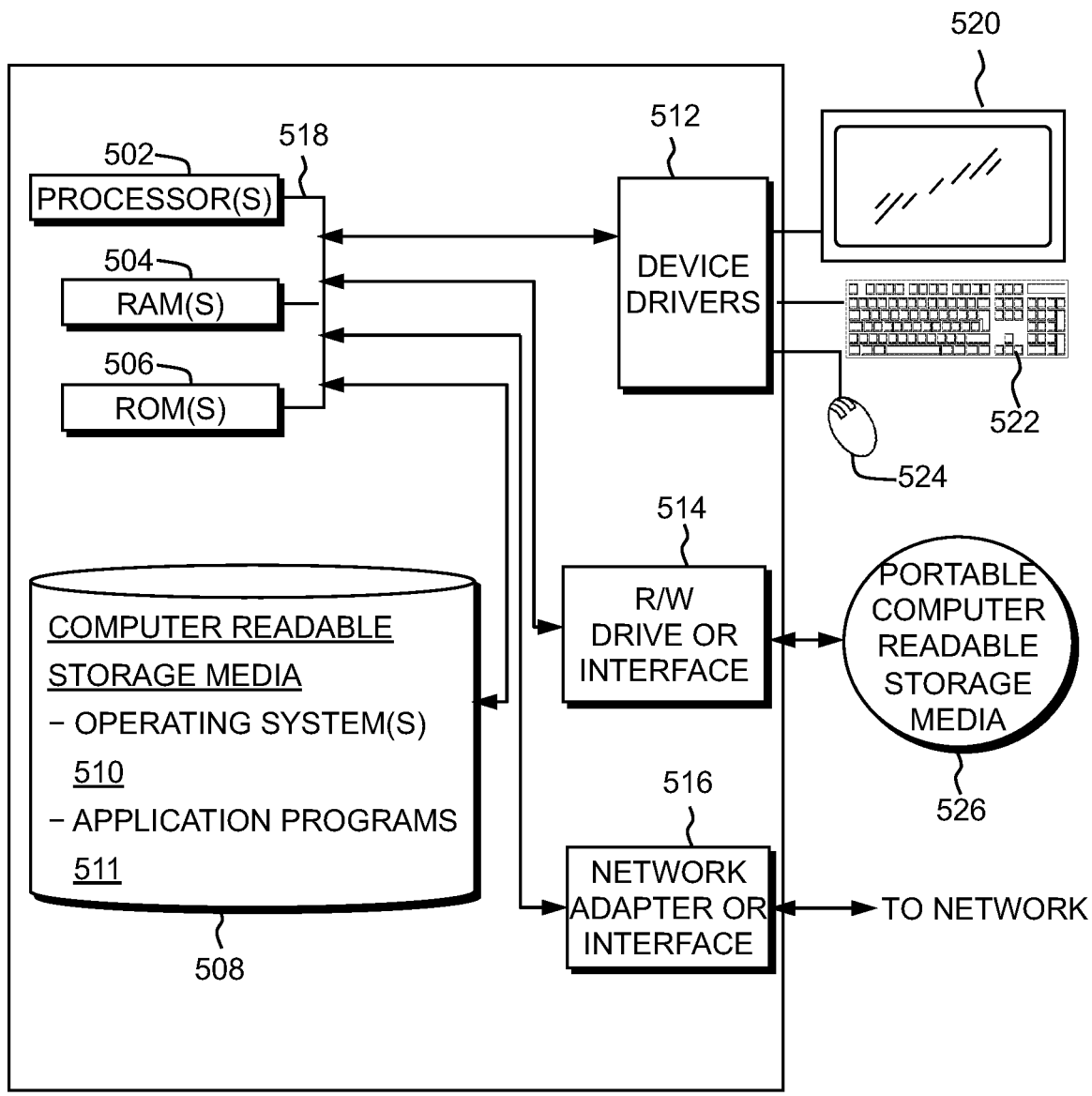
FIG. 5 is a block diagram of an embodiment of a computer system or cloud server in which the present invention may be implemented.

FIG. 5 depicts a block diagram of components of a computing system as used for the dashboard generation system 410, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write (R/W) drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the dashboard generating system 410 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 514 to read from and write to one or more portable computer readable storage media 526. Application programs 511 on the computing system can be stored on one or more of the portable computer readable storage media 526, read via the respective RAY drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, RAY drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
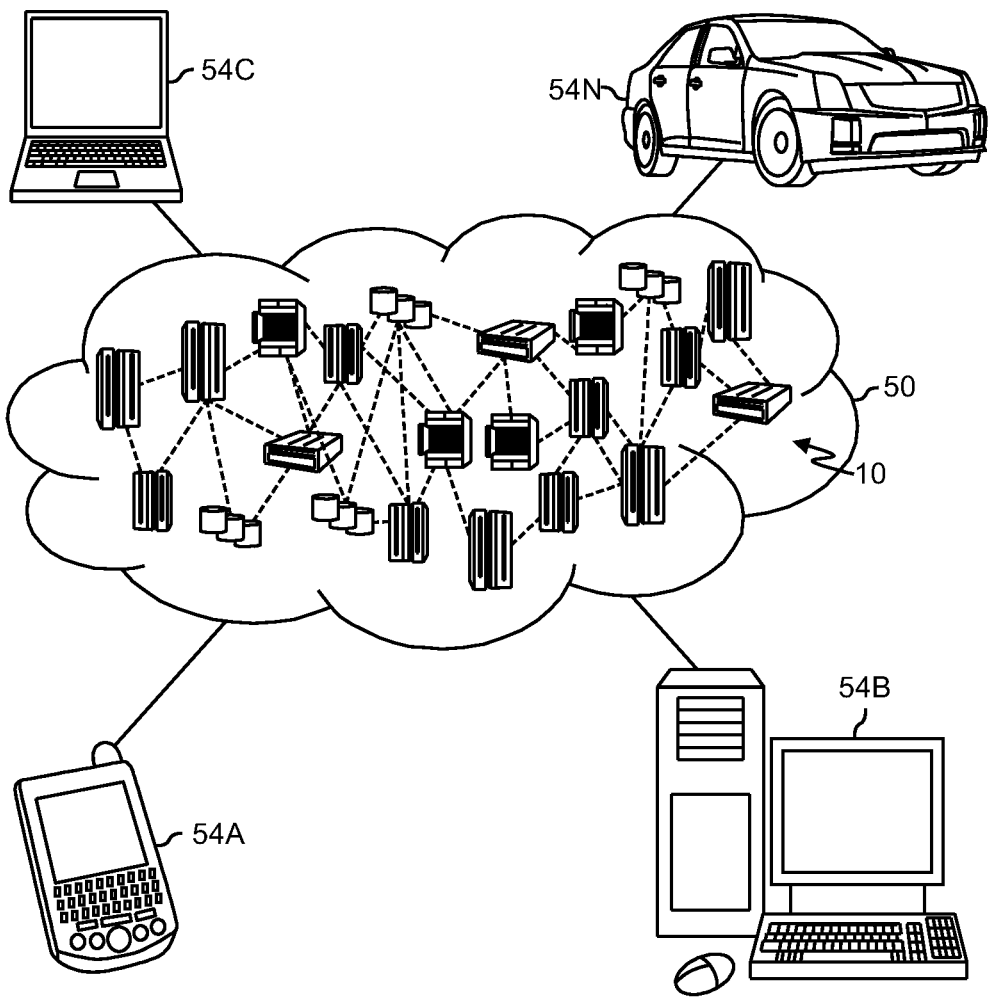
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
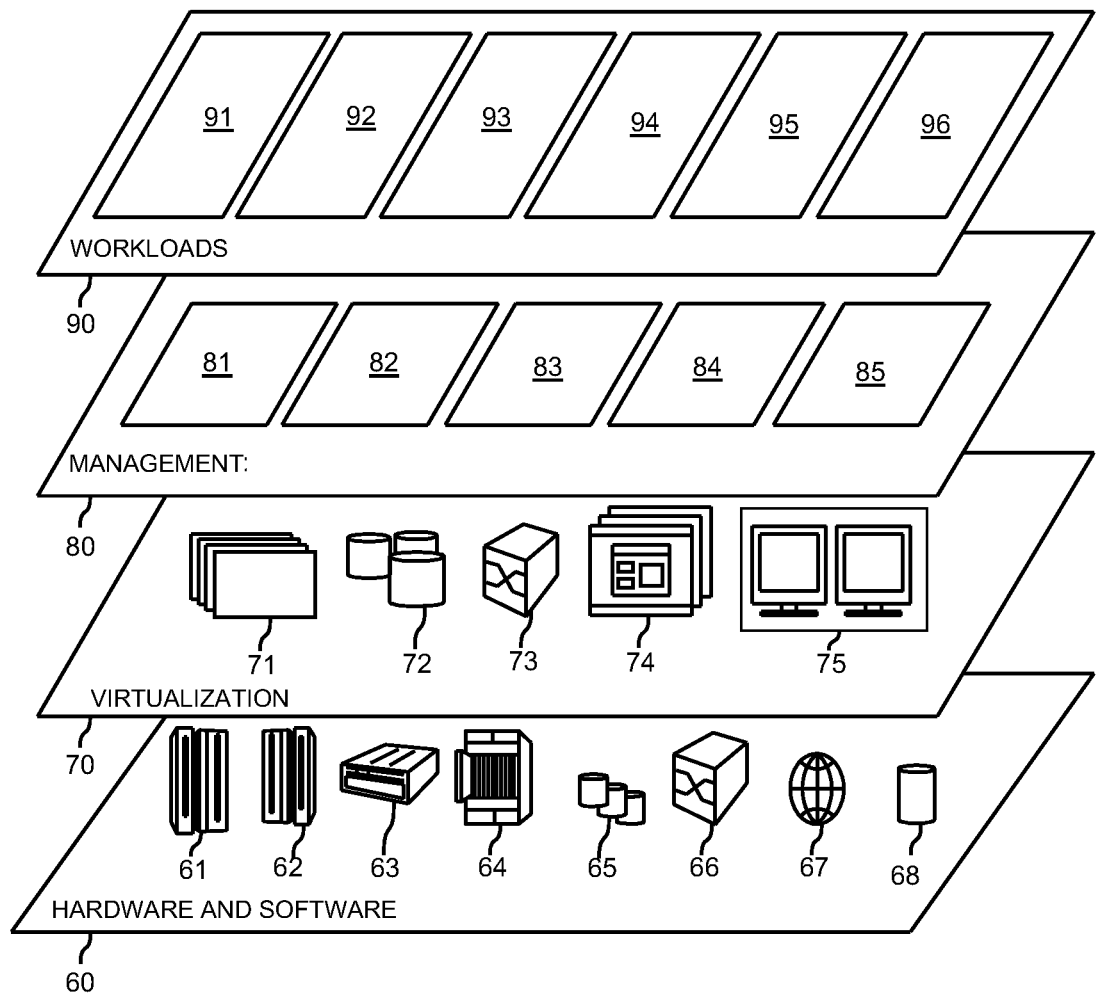
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dashboard generation processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for generation of graphical user interface dashboard templates, comprising:
   tracking, by one or more processors, user interactions with an editable graphic user interface dashboard when handling issue instances to gather one or more pre-generated chart selections, wherein a chart is a graphical visualization of one or more parameters of a data source, and wherein tracking user interactions with the editable graphic user interface dashboard comprises:
   monitoring one or more chart selections, one or more chart deletions, and one or more data source configurations to a generated dashboard template instance implemented by a user using an editable dashboard tool when diagnosing an issue type; and storing, based on the monitoring, a modified dashboard template instance implemented by the user when diagnosing the issue type;

training, by the one or more processors, a machine learning model to create mapping between the issue type and one or more chart visualization attributes of the modified dashboard template instance;

dynamically mapping, by the one or more processors, with the machine learning model, based on the gathered one or more pre-generated chart selections, common associations between the issue type and the one or more chart visualization attributes;

generating, by the one or more processors, generalized data source parameters for one or more data fields associated with the issue type to enable an automatic selection of one or more of the generated generalized data source parameters for future issues of the same issue type;

automatically generating, by the one or more processors, a new graphical user interface dashboard template for a future instance of the issue type based, at least in part, on the generated generalized data source parameters and the generated association rules between the issue type to chart pairs; and updating, by the one or more processors, the machine learning model, based, at least in part, on gathered information from monitoring user interactions with the new graphical user interface dashboard template.

2. The computer-implemented method as claimed in claim 1, including:

generating, by the one or more processors, a dashboard template instance for a current issue instance of a known issue type, wherein the dashboard template instance includes options of one or more likely chart visualization attribute with one or more generalized data source parameters; and populating, by the one or more processors, the generalized data source parameters with specific parameters for the current issue instance based on attributes of events in the current issue instance.

3. The computer-implemented method as claimed in claim 1, further including grouping, by the one or more processors, user interactions for issue instances that relate to a same issue type based on the information of the issue instance when identifying issue type to chart pairs.

4. The computer-implemented method as claimed in claim 1, wherein generating, by the one or more processors, generalized data source parameters for one or more data fields associated with the issue to enable an automatic selection of one or more the data source parameters for future issues of the same issue type further includes:

for each issue instance, identifying, by the one or more processors, one or more fields of one or more events that is a chart data source parameter to store event field to data source parameter pairs;

identifying, by the one or more processors, event field to data source parameter pairs present in a configurable proportion of issue instances; and generalizing, by the one or more processors, the data source parameters of the identified event field to data source parameter pairs.

5. The computer-implemented method as claimed in claim 1, wherein dynamically mapping, by the one or more processors, with the machine learning model based on the gathered one or more pre-generated chart selections, common associations between the issue type and one or more chart visualization attributes further includes:

performing, by the one or more processors, association rule mining on identified issue type to chart pairs to produce association rules between common issue type to chart pairs.

6. The computer-implemented method as claimed in claim 5, further including:

producing, by the one or more processors, a series of association rules between issue types and chart visualization attributes with a support value and a confidence value to allow filtering to chart visualization attribute likely to be used by an operator for each issue type.

7. The computer-implemented method as claimed in claim 1, wherein tracking, by the one or more processors, user interactions with an editable graphic user interface dashboard when handling issue instances to gather one or more pre-generated chart selections when handling issue instances for an issue type gathers sufficient information for an issue type to store dashboard information for a new issue type.

8. The computer-implemented method as claimed in claim 1, further including:

receiving, by the one or more processors, a current issue instance and determining if the issue instance is an issue type for which dashboard information is stored; and if no stored dashboard information is available, monitoring, by the one or more processors, user interactions to generate dashboard information for the new issue type.

9. A computer system for generation of dashboard templates for generation of graphical user interface dashboard templates for operations management, comprising:

one or more computer processors;

one or more computer readable storage media; and computer program instructions, the computer program instructions being stored on the one or more computer readable storage media for execution by the one or more computer processors:

the computer program instructions including instructions to:

track user interactions with an editable graphic user interface dashboard when handling issue instances to gather one or more pre-generated chart selections, wherein a chart is a graphical visualization of one or more parameters of a data source, and wherein tracking user interactions with the editable graphic user interface dashboard comprises instructions to:

monitor one or more chart selections, one or more chart deletions, and one or more data source configurations to a generated dashboard template instance implemented by a user using an editable dashboard tool when diagnosing an issue type; and store, based on the monitoring, a modified dashboard template instance implemented by the user when diagnosing the issue type;

train a machine learning model to create mapping between the issue type and one or more chart visualization attributes of the modified dashboard template instance;

dynamically map, with the machine learning model, based on the gathered one or more pre-generated chart selections, common associations between the issue type and one or more chart visualization type-attributes;

generate generalized data source parameters for one or more data fields associated with the issue type to enable an automatic selection of one or more of the generated generalized data source parameters for future issues of the same issue type;

automatically generate a new graphical user interface dashboard template for a future instance of the issue type based, at least in part, on the generated generalized data source parameters and the generated association rules between the issue type to chart pairs; and update the machine learning model, based, at least in part, on gathered information from monitoring user interactions with the new graphical user interface dashboard template.

10. The computer system as claimed in claim 9, further including instructions to:

generate a dashboard template instance for a current issue instance of a known issue type, wherein the dashboard template instance includes options of one or more likely chart visualization attribute with one or more generalized data source parameters; and populate the generalized data source parameters with specific parameters for the current issue instance based on attributes of events in the current issue instance.

11. The computer system as claimed in claim 9, further including instructions to group user interactions for issue instances that relate to a same issue type based on the information of the issue instance when identifying issue type to chart pairs.

12. The computer system as claimed in claim 9, wherein the instructions to dynamically map, based on the gathered one or more pre-generated chart selections, common associations between an issue type and one or more chart visualization attributes further includes instructions to:

identify one or more fields of one or more events that is a chart data source parameter to store event field to data source parameter pairs;

identify event field to data source parameter pairs present in a configurable proportion of issue instances; and generalize the data source parameters of the identified event field to data source parameter pairs.

13. The computer system as claimed in claim 9, wherein the instructions to dynamically map, based on the gathered one or more pre-generated chart selections, common associations between an issue type and one or more chart visualization attributes further include instructions to perform association rule mining on identified issue type to chart pairs to produce association rules between common issue type to chart pairs.

14. The computer system as claimed in claim 13, wherein the instructions to dynamically map, based on the gathered one or more pre-generated chart selections, common associations between an issue type and one or more chart visualization attributes further include instructions to produce a series of association rules between issue types and chart visualization attributes with a support value and a confidence value to allow filtering to chart visualization attributes likely to be used by an operator for each issue type.

15. The computer system as claimed in claim 9, wherein the instructions to track, user interactions with an editable graphical user interface dashboard when handling issue instances for an issue type includes gathering sufficient information for an issue type to store dashboard information for a new issue type.

16. The computer system as claimed in claim 9, further including instructions to:

receive a current issue instance and a known issue type component for determining if the issue instance is an issue type for which dashboard information is stored.

17. A computer program product for generation of dashboard templates for generation of graphical user interface dashboard templates, the computer program product comprising one or more computer readable storage media and program instructions stored on the one or more computer readable storage media, the program instructions including instructions to:

track user interactions with an editable graphic user interface dashboard when handling issue instances to gather one or more pre-generated chart selections, wherein a chart is a graphical visualization of one or more parameters of a data source, and wherein tracking user interactions with the editable graphic user interface dashboard comprises instruction to:

monitor one or more chart selections, one or more chart deletions, and one or more data source configurations to a generated dashboard template instance implemented by a user using an editable dashboard tool when diagnosing an issue type; and store, based on the monitoring, a modified dashboard template instance implemented by the user when diagnosing the issue type;

train a machine learning model to create mapping between the issue type and one or more chart visualization attributes of the modified dashboard template instance;

dynamically map, with the machine learning model, based on the gathered one or more pre-generated chart selections, common associations between the issue type and one or more chart visualization type-attributes;

generate generalized data source parameters for one or more data fields associated with the issue type to enable an automatic selection of one or more of the generated generalized data source parameters for future issues of the same issue type;

automatically generate a new graphical user interface dashboard template for a future instance of the issue type based, at least in part, on the generated generalized data source parameters and the generated association rules between the issue type to chart pairs; and update the machine learning model, based, at least in part, on gathered information from monitoring user interactions with the new graphical user interface dashboard template.

18. The computer program product as claimed in claim 17, wherein the program instructions further include instructions to:

generate a dashboard template instance for a current issue instance of a known issue type, wherein the dashboard template instance includes options of one or more likely chart visualization attributes with one or more generalized data source parameters; and populate the generalized data source parameters with specific parameters for the current issue instance based on attributes of events in the current issue instance.

* * * * *